June 9, 1959 G. A. RALSTON 2,889,877
PROTRACTOR SHEAR
Filed Oct. 10, 1957
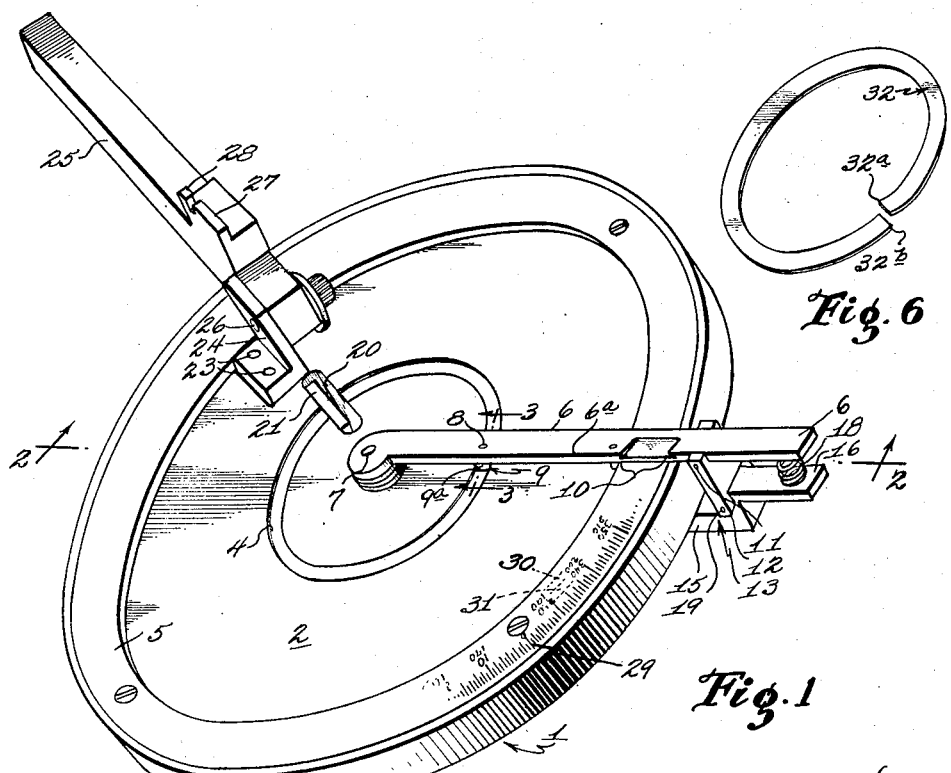
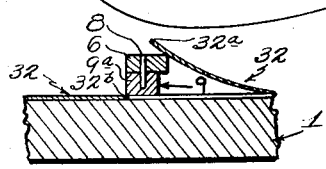
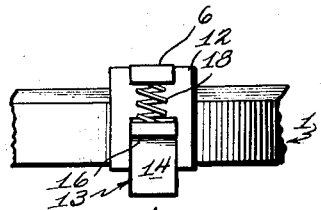
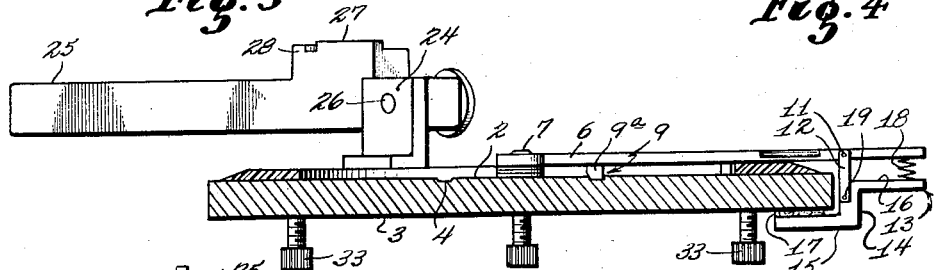
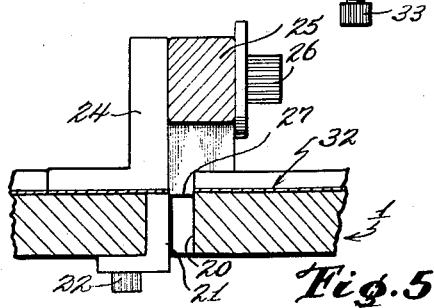
INVENTOR
GAVIN A. RALSTON
BY Charles J. Elderkin
ATTORNEY

United States Patent Office 2,889,877
Patented June 9, 1959

2,889,877

PROTRACTOR SHEAR

Gavin A. Ralston, Northport, N.Y., assignor to Micro Machine Works, Inc., Roosevelt, N.Y.

Application October 10, 1957, Serial No. 689,406

7 Claims. (Cl. 164—42)

This invention relates to shearing devices and more particularly to a novel protractor shear for cutting arcs of accurately predetermined length from thin, circular rings.

For various purposes, and particularly for the production of electrical bus bars for use in connection with potentiometers of the type disclosed in my copending application, Serial Number 575,010, filed March 30, 1956, now Patent No. 2,826,664, it is frequently necessary to obtain an arcuate, very thin, sheet metal piece of accurately predetermined length. While such arcuate pieces can be cut from a metal ring by hand, and the necessary accuracy of length thus achieved, such a procedure is very slow and, for commercial purposes, entirely unsatisfactory.

It is accordingly an object of the present invention to devise a protractor shear by means of which arcs of accurately predetermined length can be obtained readily from thin sheet metal rings.

Another object is to provide such a shear capable of handling very thin sheet metal without permanent distortion thereof during the measuring and cutting operations.

A further object is to provide a protractor shear having novel protractor guide means whereby the operator can position the thin sheet metal workpiece more accurately relative to the shearing line.

Yet another object is to devise a protractor shear, particularly for cutting arcs from sheet metal rings, the device including novel means whereby a radially disposed cut in such ring can be used as a reference point during measurement of the arc to be severed from the ring.

In order that the manner in which these and other objects are attained in accordance with the invention can be understood in detail, reference is had to the accompanying drawings, which form a part of this specification, and wherein:

Fig. 1 is a view in perspective of a protractor shear constructed in accordance with one embodiment of the invention;

Fig. 2 is a transverse elevational view, taken on line 2—2, Fig. 1;

Fig. 3 is a detail transverse elevational view, on larger scale than Fig. 1, and taken on line 3—3, Fig. 1, but with a workpiece in place;

Fig. 4 is an end elevational view, on larger scale than Fig. 1, of the measuring arm assembly of the device of Fig. 1;

Fig. 5 is a detail view, partly in vertical section and partly in elevation, illustrating the shearing means of the device of Fig. 1; and Fig. 6 is a view in perspective of a typical sheet metal ring from which an arc is to be sheared with the device of Fig. 1.

Referring now to the drawings in detail, and first to Figs. 1 and 2 thereof, it will be seen that the embodiment of the invention here illustrated comprises a circular base 1 having a flat upper surface 2 and a flat lower surface 3. In the upper surface 2 of the base, there is provided a circular groove 4 concentric with the circular outer edge of the base. Also on the upper face of the base there is mounted a circular protractor scale 5 disposed outwardly of and concentric with the groove 4.

A protractor arm 6 is mounted above the upper face of the base for rotation about the center of the base. Thus, the arm 6 is fixed to a pin 7 journaled in a central bore in the base 1. It will be noted that the arm 6 includes a portion disposed above the circular groove 4, another portion extending across the protractor scale 5 and an end portion extending beyond the circular edge of the base 1. The arm 6 is rotatable in a plane parallel to and spaced above the upper face 2 of the base 1.

Secured to arm 6, as by a dowel pin 8, and depending from the lower surface thereof, is a foot 9 aligned vertically with the groove 4. It will be noted that the foot 9 is of generally rectangular transverse cross section and that its width, in the direction of the length of arm 6, is slightly less than the width of groove 4. It will also be noted that one face 9ª of the foot is aligned with an edge 6ª of the protractor arm which extends radially of the center of the base 1.

In the portion thereof extending across the protractor scale 5, the arm 6 provides a straight edge, indicated at 10, cooperating with the protractor scale for the reading of angles therefrom. The straight edge 10 can be advantageously thinned down by chamfering the arm 6, as seen in Figs. 1 and 2.

Secured to the end portion of the arm 6, as by a dowel pin 11, and depending from the arm at a point adjacent the edge of base 1, is a generally H-shaped member 12. The upper arms of the H-shaped member 12 embrace the arm 6. Between the lower arms of the H-shaped member 12 is pivotally mounted a lever indicated generally at 13. As best seen in Fig. 2, the lever 13 has a vertical portion 14 disposed between the legs of the member 12, a lower generally horizontal arm 15 extending beneath the lower surface 3 of the base 1, and an upper generally horizontal arm 16 extending away from the base and aligned with the end portion of the protractor arm 6. Secured to the top face of the arm 15 of lever 13 is a friction element 17 adapted to engage the lower surface 3 of base 1. A coil spring 18 is positioned between arm 16 of lever 13 and the free end of arm 6, the ends of the spring 18 being seated in suitable sockets in the members just mentioned.

The lever 13 is pivoted to the lower legs of the member 12 by means of a pivot pin 19 extending generally tangentially with respect to the circular outer edge of base 1. The space between the pivot pin 19 and the arm 6 is such that the coil spring 18 is under compression, tending normally to pivot lever 13 in a direction urging arm 15 thereof to force element 17 into frictional engagement with the lower surface 3 of base 1.

Extending radially from the center of base 1, and therefore cutting radially across the groove 4, is a vertical slot 20. The slot 20 extends completely through the base 1. As best seen in Fig. 5, there is mounted in the slot 20 a fixed cutter element 21 disposed radially of the center of the base and smaller in width than the slot 20. The fixed cutter element 21 is advantageously made L-shaped and secured in place by means of screws 22, Fig. 5, extending through the base of the L and threaded in the base member 1.

Disposed between the protractor scale 5 and groove 4, and secured to the base 1, as by means of screws 23 extending through the base from the bottom surface thereof, is an upright bracket 24. A cutter arm 25 is pivoted to the bracket 24 by means of a shaft 26 having its end threaded into the upright portion of bracket 24. From Fig. 1, it will be noted that the bracket 24 is so disposed, and the shaft 26 so arranged, that the cutter bar 25 pivots in a plane disposed radially with respect to the axis of rotation of protractor arm 6.

At a point spaced along its length from bracket 24, cutter arm 25 is provided with an element 27 constituting the movable cutting element of the shearing means. The cutting element 27 is so arranged that, when arm 25 is pivoted toward upper face 2 of base 1 until stop element 28, Figs. 1 and 2, engages upper face 2, cutting element 27 enters slot 20, moving downwardly in shearing relation along the face of fixed element 21. Thus, the fixed cutter element 21 and the movable cutter element 27 cooperate to shear the sheet metal ring, when the same is disposed in groove 4, the shearing action being along a line extending radially across the groove 4. It will be understood that bracket 24 is mounted in such manner that the shearing line is fixed in predetermined relation to the protractor scale 5. Thus, the shearing line may be the zero reading on the protractor scale.

The protractor scale 5 may consist of a transparent ring of resinous material having a white, opaque backing disposed against the upper face 2 of base 1, such backing being inscribed with radially directed graduations, as indicated at 29, Fig. 1, representative of angular displacement from the base line established by the shearing edge of the fixed cutter element 21. Every tenth graduation is identified by one series of reference characters, in circular area 30, reading from the shear side of the protractor as zero. Another set of reference characters is provided in the circular area 31, reading from graduation 29 as zero.

In using the protractor shear of the present invention, the sheet metal rings 32, Fig. 6, to be sheared, are first cut along a radial line, to provide the two free ends 32$^a$ and 32$^b$. This is accomplished by squeezing the tips of members 6 and 16 together, against spring 18, so releasing the friction brake 17, rotating arm 6 to a position displaced about 180° from the shear line, releasing members 6 and 16, and then nesting a portion of the ring 32 in groove 4, the ring passing over arm 6 and being held manually in the groove 4 adjacent the shear line. The shear arm 25 is then actuated to make the cut providing ends 32$^a$ and 32$^b$. The ring 32 is then removed and arm 6 rotated until face 9$^a$ of foot 9 is disposed at the desired angle.

The ring is now again placed on the shear, with end 32$^b$ abutting face 9$^a$ and end 32$^a$ lying on top of arm 6, as illustrated in Fig. 3, the body of the ring being held firmly in groove 4 by the operator. Shear arm 25 is now again actuated, shearing the ring in the manner illustrated in Fig. 5.

The base 1 can be of any suitable rigid material, the groove 4 being accurately machined therein. The ring positioning means comprising arm 6 and lever 13 can also be of any suitable rigid material. In order that the device can be supported in level position, the base 1 is provided with suitable legs 33, Fig. 2.

The device of the present invention is particularly adapted to shear arcs of accurately predetermined length from sheet metal ring stock of extreme thinness. Thus, ring 32 may be of coin silver on the order of .002 inch thick.

I claim:

1. In a protractor shearing device for cutting arcs of accurate length from thin circular sheet metal rings of predetermined diameter and radial width, the combination of a base having an upper face including a flat central portion provided with a circular groove in which the sheet metal rings to be sheared will rest substantially without capability of radial shifting; a protractor scale mounted on the upper face of said base concentrically with respect to said groove; work positioning means mounted above said upper face for rotation about an axis extending at right angles to the plane of said groove and through the center thereof, said positioning means including a straight edge portion extending radially of said groove and across said protractor scale to cooperate therewith for the reading of angles from said scale, a dependent foot disposed above said groove and having a straight edge aligned with said straight edge portion, and manually releasable means constructed and arranged to maintain said positioning means in any selected rotational position on said base; and shearing means mounted on said base and constructed and positioned to shear such sheet metal ring in said groove along a line extending radially of the center of said groove and fixed with reference to said protractor scale.

2. A protractor shearing device in accordance with claim 1 and wherein said base is circular, the center of said groove being at the center of said base, said positioning means extends beyond the circular edge of said base, and said manually releasable means comprises a member mounted on said positioning means for pivotal motion about an axis disposed generally tangentially with respect to said base, said member having a portion disposed beneath said base, and resilient means urging said portion into engagement with a lower surface of said base.

3. A protractor shearing device in accordance with claim 1 and wherein said manually releasable means comprises a lever disposed for movement into engagement with a bottom face portion of said base, and resilient means operatively associated with said lever to urge the same into engagement with said bottom face portion.

4. A protractor shearing device in accordance with claim 3 and wherein said lever carries a friction element disposed to engage said bottom face portion.

5. In a protractor shearing device for cutting arcs of accurate length from thin, circular, sheet metal rings of predetermined diameter and width, the combination of a rigid, circular base member having a generally flat upper face and a smooth, shallow, circular groove disposed concentrically with respect to the edge of said base, the radial width of said groove being such that the sheet metal rings to be sheared will rest in said groove substantially without capability of radial shifting; a protractor scale mounted on the upper face of said base concentrically with respect to said groove; a protractor arm mounted above the upper face of said base for rotary movement about the center of said base, said arm including a portion disposed above said groove, another portion extending across said scale, and an end portion extending beyond the circular edge of said base, said other portion being provided with straight edge means extending radially of the center of said base and cooperating with said scale for the reading of angles therefrom; a dependent foot mounted on the portion of said arm above said groove, said foot including a straight edge aligned with said straight edge means; manually releasable means mounted on the end portion of said arm and including resiliently biased means normally engaged with a portion of said base to urge said foot toward said groove, and shearing means mounted on said base and constructed and positioned to shear such sheet metal ring along a line extending radially of the center of said base and fixed with reference to said protractor scale.

6. A protractor shear in accordance with claim 5 and wherein said protractor scale is disposed outwardly of said groove.

7. A protractor shear in accordance with claim 6 and wherein said shearing means comprises a shear bar pivoted to said base between said scale and said groove.

References Cited in the file of this patent

UNITED STATES PATENTS

| | | |
|---|---|---|
| 503,341 | Briggs | Aug. 15, 1893 |
| 1,678,319 | Blessing | July 24, 1928 |
| 1,800,706 | Turnquist | Apr. 14, 1931 |